No. 612,263. Patented Oct. 11, 1898.
T. R. McKNIGHT.
DUMP CAR.
(Application filed Mar. 28, 1898.)
(No Model.) 2 Sheets—Sheet I.
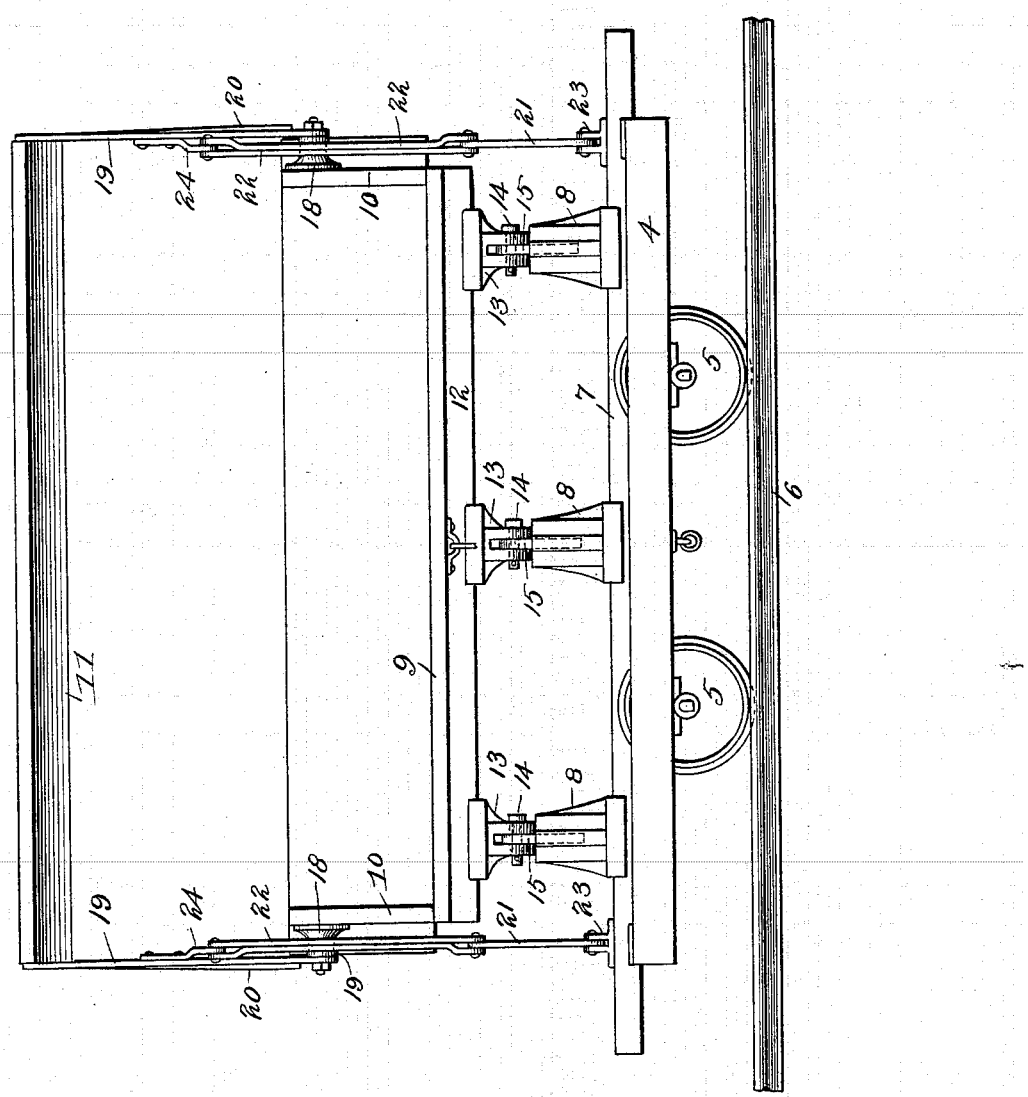

No. 612,263. Patented Oct. 11, 1898.
T. R. McKNIGHT.
DUMP CAR.
(Application filed Mar. 28, 1898.)
(No Model.) 2 Sheets—Sheet 2.
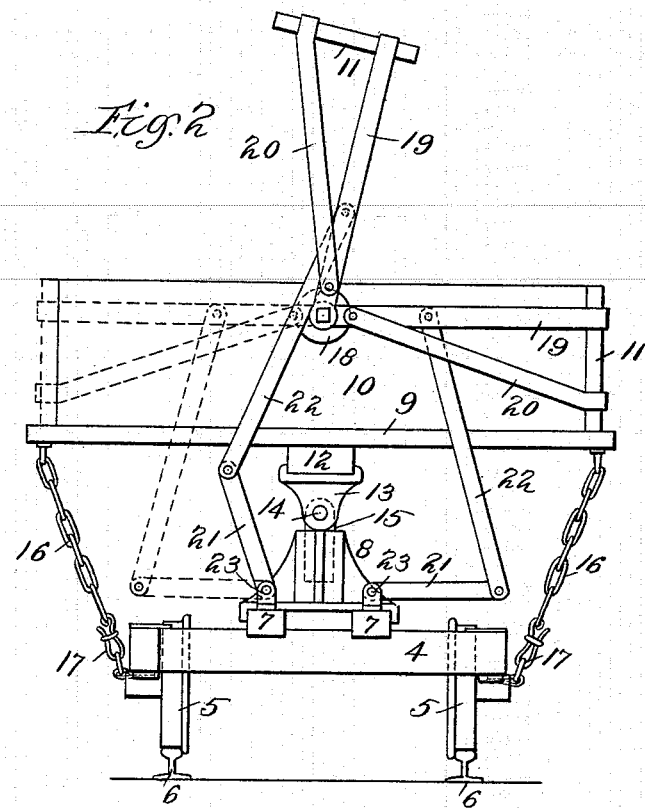
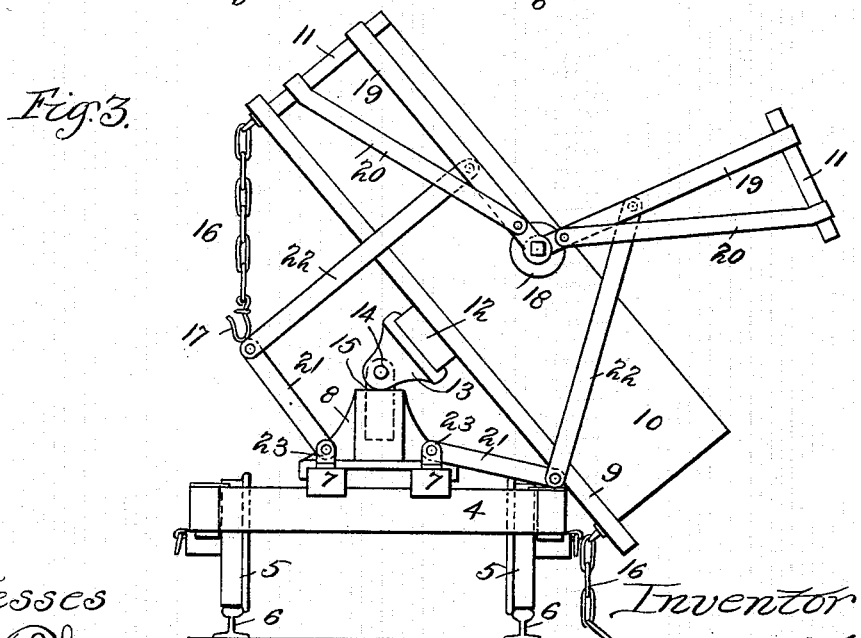

UNITED STATES PATENT OFFICE.

THOMAS R. McKNIGHT, OF AURORA, ILLINOIS, ASSIGNOR TO THE WESTERN WHEELED SCRAPER COMPANY, OF SAME PLACE.

DUMP-CAR.

SPECIFICATION forming part of Letters Patent No. 612,263, dated October 11, 1898.

Application filed March 28, 1898. Serial No. 675,478. (No model.)

*To all whom it may concern:*

Be it known that I, THOMAS R. McKNIGHT, a citizen of the United States, residing at Aurora, in the county of Kane and State of Illinois, have invented certain new and useful Improvements in Dump-Cars, of which the following is a specification, reference being had to the accompanying drawings.

My invention relates to dump-cars for use on railways.

One object of my invention is to provide a construction whereby dirt, stone, or other heavy material may be readily loaded into the car without having to throw the same higher than the floor of the car, which I accomplish by providing means whereby either side piece of the car can be raised above the car and when raised will be securely held until it is desired to return it to place. Being so raised and held permits the car to be nearly filled without the workmen being put to the additional labor of elevating all the material that is being loaded onto the car over the side piece.

Another object is to provide side pieces which will be raised automatically when the car is dumped to provide for the free discharge of the load, thus relieving such side pieces from any pressure by the material being discharged striking against them.

Another object of my invention is the provision of novel means for connecting the car-body and its truck, which construction possesses the advantages of permitting the two parts to be readily united, of permitting the car-body to be readily turned to dump its load when desired, and in case of accident to the car, as in the event of derailment, to permit the car-body and its truck to separate, and thereby lessen the danger of damage to both of said parts.

I accomplish these stated objects by the construction and arrangement of parts shown in the drawings and hereinafter specifically described.

That which I regard as new will be set forth in the claims.

Referring to the drawings, Figure 1 is a side elevation with one of the sides raised to facilitate the loading of the car. Fig. 2 is an end view with the parts in the same position as in Fig. 1 and showing also, in broken lines, the position of the raised side and its arms and levers when lowered; and Fig. 3 is an end view with the car in dumping position.

In the drawings, 4 indicates the car-truck, 5 the wheels thereof, and 6 the track-rails.

7 indicates beams extending longitudinally of the truck, on which are suitably secured heavy supports 8.

9 indicates the floor of the car-body, 10 the stationary end pieces, and 11 the movable side pieces. To a heavy timber 12, or in any other suitable manner, are secured to the under surface of the floor 9 a series of depending brackets 13, to each of which is pivoted, by a pivot 14, a pin 15, which, as shown, is flat or of plate form. Each support 8, as shown, is provided with a socket of proper shape and size to receive one of the pivoted pins 15, such pins being arranged, as shown, with their flat faces transversely of the car, by reason of which there is no liability of their being bent or broken under the strain they are subjected to as the car-body is inclined for dumping the load. The portions of the brackets 13 that rest upon the supports 8 when the car-body and truck are united are rounded, as shown, in order to permit of the tilting of the car-body into and out of dumping position.

16 indicates chains at each side of the car-body and adapted by means of hooks 17 to be attached to the car-truck, and when both chains are so attached the car-body will be prevented from tipping. Midway between its ends and, as shown, near its upper edge there is secured to each stationary end piece 10 of the car-body 9 a projection 18, to which are pivoted two arms 19, the outer end of each being bolted or otherwise securely fastened to one of the movable side pieces 11 of the car-body. 20 indicates other arms, each being secured at one end to one arm 19, near the pivot thereof, and having its other end secured to the side piece 11, as clearly shown in Figs. 2 and 3, and acting as a brace to hold the side pieces in place.

21 22 indicate a pair of toggle-levers, two pairs being provided for use in operating each movable side piece 11. The lower member of each toggle-lever is suitably pivoted to the truck, it being, as shown, pivoted between a pair of ears 23, secured to one of the longitudinal beams 7. The upper member 22 of each toggle-lever is shown as formed of two parallel pieces, between the lower ends of which the upper end of the member 21 is pivoted. The upper end of the member 22 is secured to the arm 19 through a short metal strap 24, bolted to the inner face of the arm 19, through which strap 24 and the upper ends of the upper members 22 passes a pivot, as clearly shown in Fig. 1.

When it is desired to load a car constructed as described, the side piece 11 that is next to the material that is to be placed on the car is swung up by hand into its highest position, as indicated in Fig. 2, the toggle-levers 21 22, connected to that side piece, turning freely on their pivots as the side piece moves. When the side piece reaches the position shown in Fig. 2, it is prevented from moving farther by the upper members 22 of its toggle-levers coming in contact with the projections 18 on the stationary end pieces 10 of the car-body, which, as shown, project sufficiently to form effectual stops for such levers. The length and location of the toggle-levers are such that by the time the upward and backward movement of the side piece is stopped, as described, such side piece will have passed the pivots that secure the arms 19 to the projections 18, thus causing the side piece to be firmly held in its elevated position while the loading of the car is being performed. When the car is loaded to the extent permissible in the absence of such side piece, the side piece is swung forward beyond the projections 18 and allowed to drop into place, when the small portion of loading required to fill the car is done. Both sides of the car are equipped alike, and the car can therefore be loaded equally well from either side or turned to dump its load at either side.

In discharging a load the chain 16 on the opposite side from which the dumping is to be done is released from engagement with the truck and the car-body rocked to one side on its rounded brackets 13, which rest on the supports 8 on the truck. As the car-body thus rocks to one side the toggle-levers on the side from which the load is to be discharged come in contact with the frame of the truck (see Fig. 3) and force the side piece 11, with which they are connected, away from the car-body, thus leaving a clear passage for the load from the floor 9 of the car-body to the ground. In the return of the car-body to its normal position the toggle-levers act to return the side piece to place and retain it tightly against the ends of the stationary end pieces 10. In addition to the moving of the side pieces, as already described, the toggle-levers perform the additional function of steadying the car-body when a load is being placed into or dumped out of the car.

By connecting the car-body to the truck by means of the pins 15, as already described, a very cheap, simple, and effective means of holding said two parts together is provided, which, at the same time, is one well adapted to allow of a complete separation of said parts one from the other in the event of a serious accident to the car, so that the danger of total demolition of the car as a whole is much less than if the truck and car-body were more rigidly fastened together.

That which I claim as my invention, and desire to secure by Letters Patent, is—

1. In a dump-car, a truck, and socketed supports on said truck, in combination with a car-body, brackets depending from said car-body, and pins pivoted to said brackets and adapted to enter the sockets in said supports, substantially as specified.

2. In a dump-car, a truck, and supports on said truck having sockets in their upper ends, in combination with a car-body, brackets depending from said car-body and provided with rounded portions to permit of a rocking movement, and pins pivoted to said brackets and adapted to enter the sockets in said supports, substantially as specified.

3. In a dump-car, a truck, and supports on said truck having sockets in their upper ends, in combination with a car-body, brackets depending from said car-body, and flat pins pivoted to said brackets and adapted to enter the sockets in said supports, said flat pins being located so that their edges are toward the sides of the truck, substantially as and for the purpose specified.

4. In a dump-car, a car-body having a movable side piece, and an arm attached at one end to said side piece and pivotally secured at its other end, in combination with a toggle-lever, one member of which is pivotally secured to said arm, and the other member pivotally secured to the truck, substantially as and for the purpose specified.

5. In a dump-car, the combination with a car-body, of a movable side piece, an arm secured at one end to said side piece and pivotally secured at its other end, a truck, a toggle-lever pivoted to said arm and to the truck, and a stop against which the toggle-lever abuts to hold the side piece elevated, substantially as and for the purpose specified.

6. In a dump-car, the combination with a car-body having end pieces 10, movable side pieces 11, and a projection 18 on each of said end pieces, of arms 19 pivoted to said projection and connected to said movable side pieces, a truck, means for mounting the car-body on the truck so as to allow said body to be rocked, and toggle-levers 21 22 pivoted to the truck and to the arms 19, and adapted to hold the side pieces in an elevated position, substantially as and for the purpose specified.

THOMAS R. McKNIGHT.

Witnesses:
WM. D. FOULKE,
F. C. DILLON.